3,564,721
TESTING CONCENTRICITY OF THREADED
SURFACES AND DEVICE THEREFOR
Donald B. Wilson, 1529 Ries St.,
Barberton, Ohio 44203
Filed Aug. 9, 1968, Ser. No. 751,405
Int. Cl. G01b 5/28
U.S. Cl. 33—174                    2 Claims

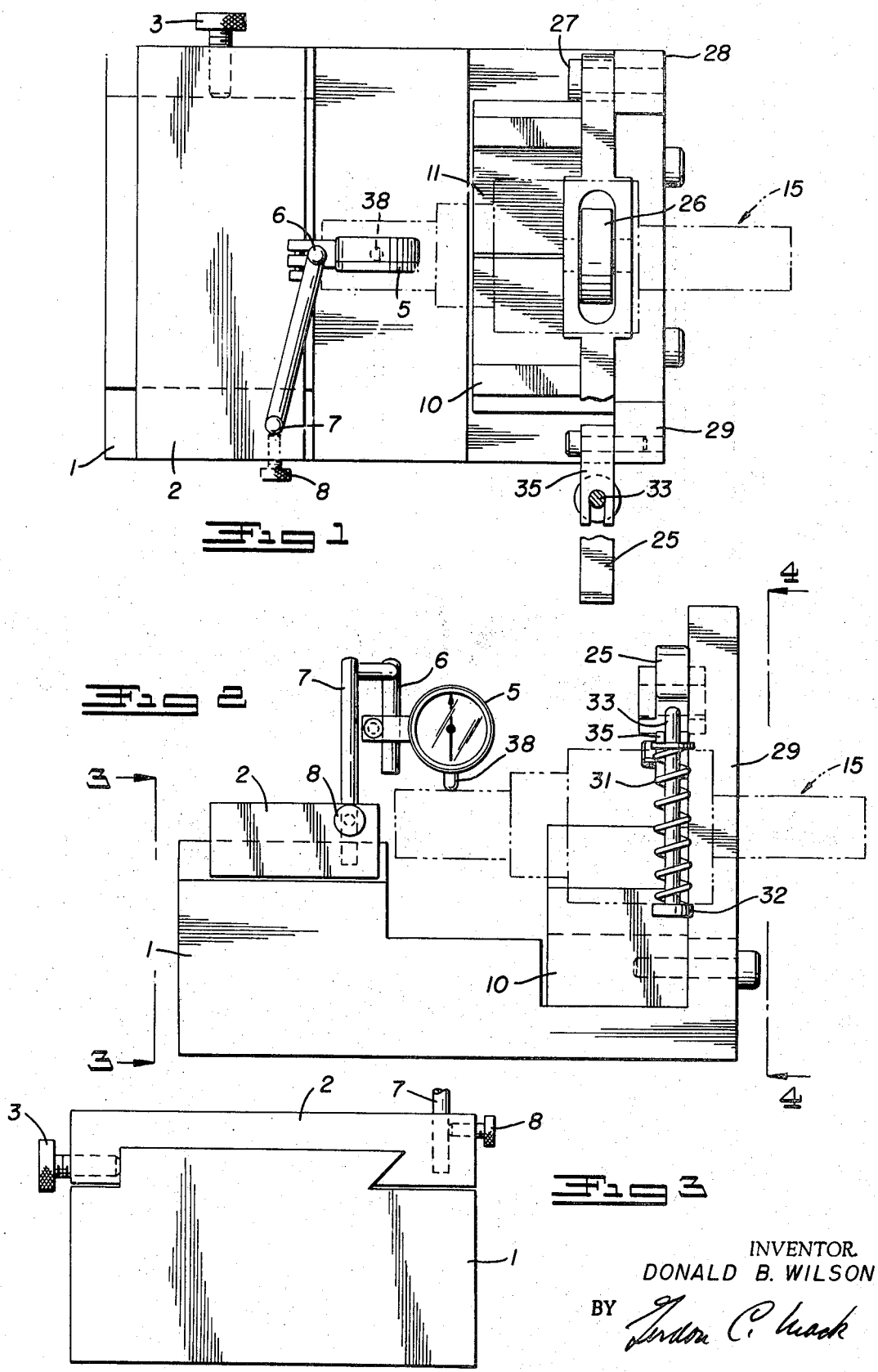

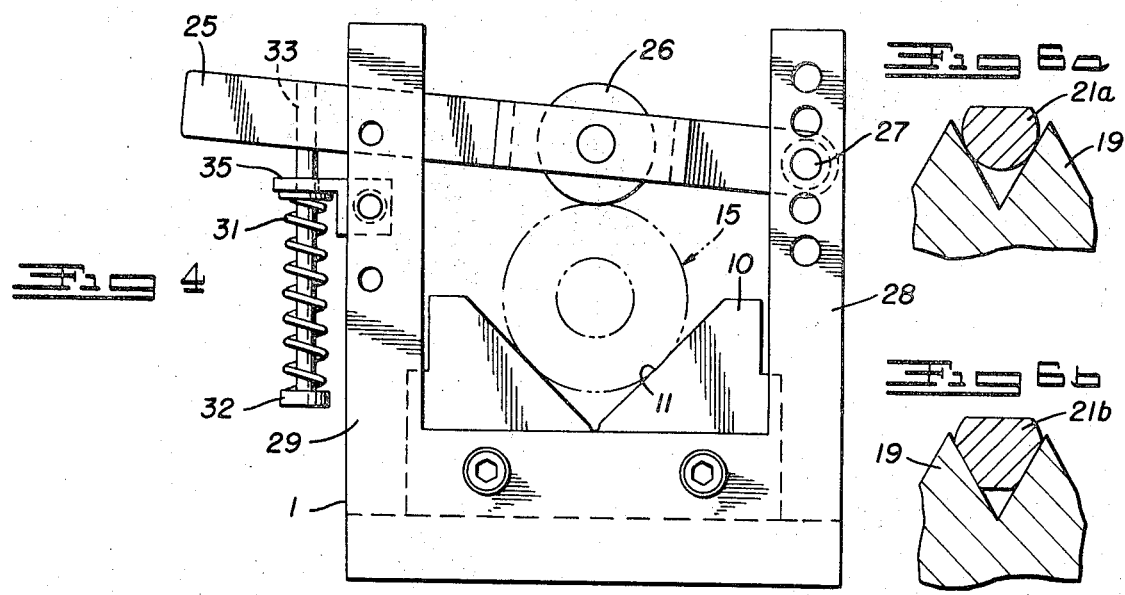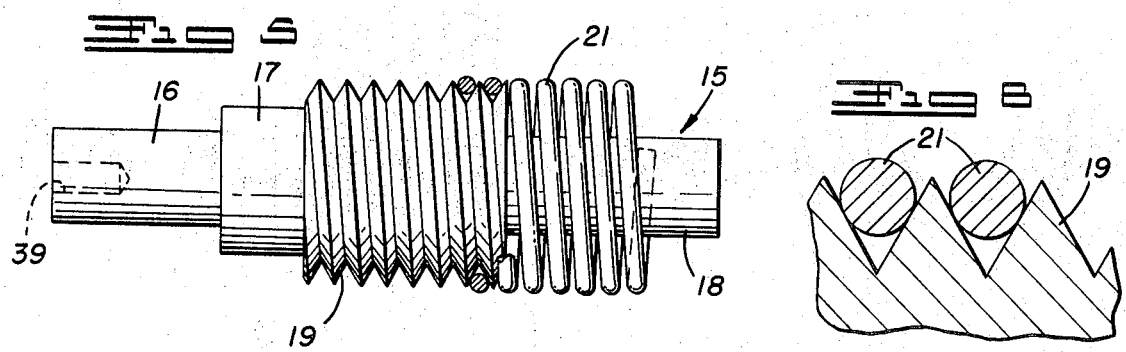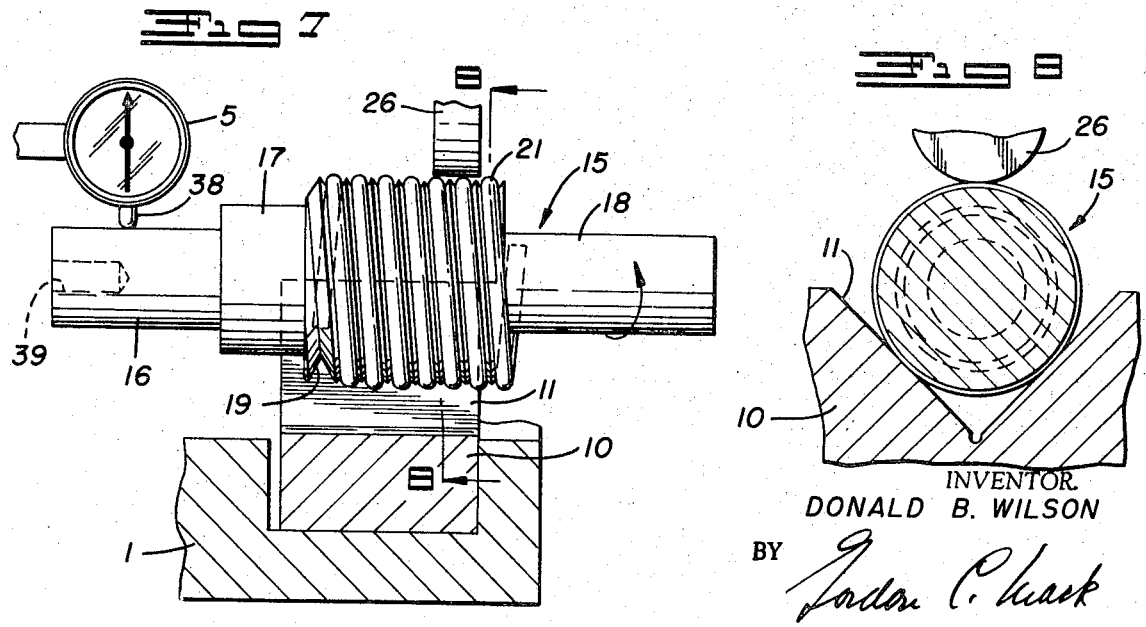

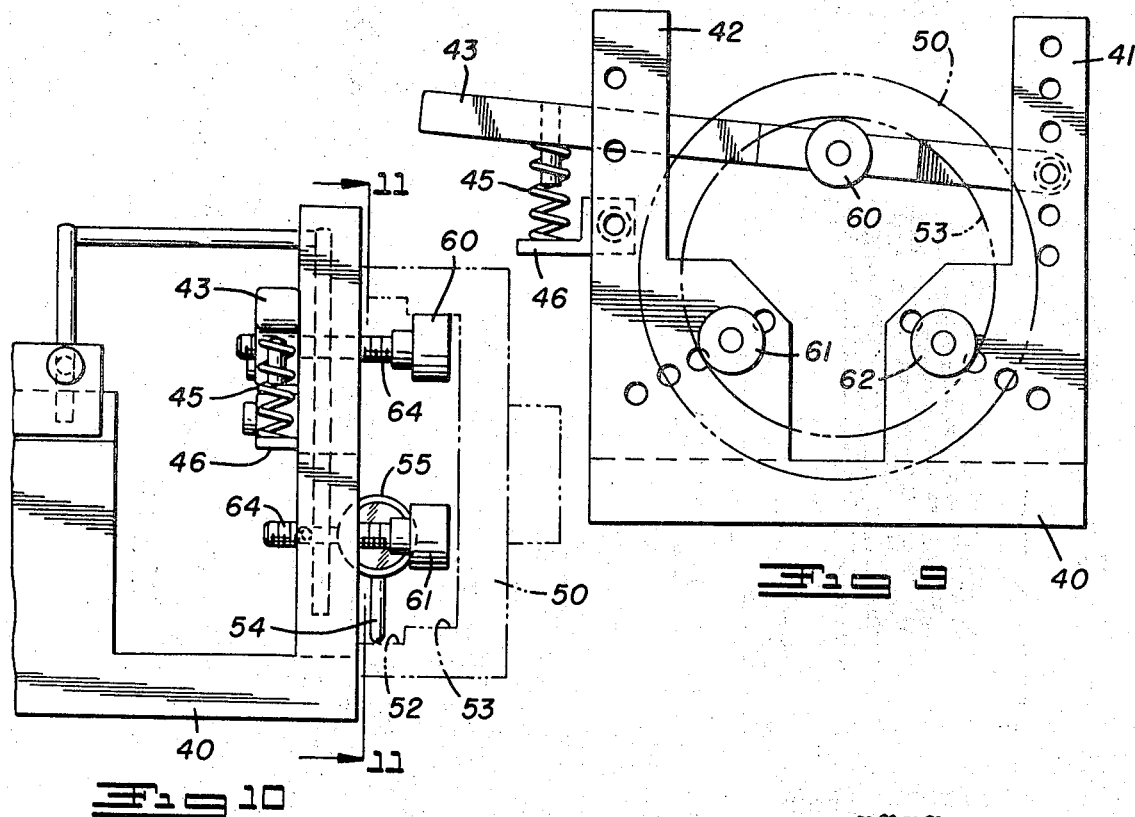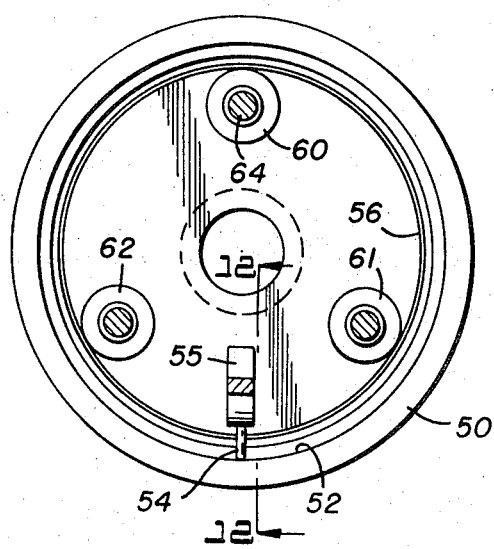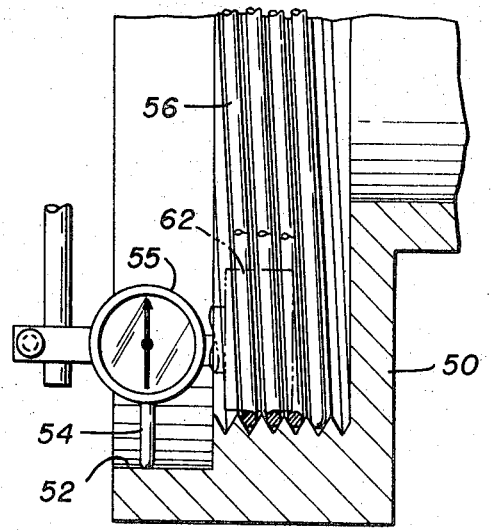

ABSTRACT OF THE DISCLOSURE

A device is shown for checking the concentricity of external and internal threads embodied in an element which includes a smooth cylindrical surface concentric therewith. A spring coil prepared from wire of uniform diameter is threaded over or within the threads (depending upon whether they are external or internal threads) and the check is made with the resulting coil surface which projects beyond the crest of the thread.

---

The invention relates to apparatus for checking the concentricity of an external or internal thread against a smooth cylindrical surface on the same element which is concentric with the thread. The invention includes apparatus and the method. Difficulty is experienced in checking the concentricity of a thread against a smooth surface because there is no wide surface of the thread against which to register a gauge or the like.

According to this invention a spring coil prepared from wire of uniform diameter is threaded into the internal or external thread. This coil is not used as a spring, but it actually is formed as a spring. If the thread which is to be checked be an external thread, the coil is of somewhat smaller diameter so as to grip the thread, and if it be an internal thread, the coil is of somewhat larger diameter so as to firmly seat itself in the thread. The coil preferably has the same number of turns per inch as the threaded element which is to be checked so that it seats itself without distortion. Once the coil is seated in the thread, any usual method of measuring concentricity between two cylindrical surfaces may be employed. Any variance in the diameter of the crest will not be reflected in the test provided herein because in effect it is the concentricity of the pitch diameter that is being tested; because the coil seats in the thread and the test is true whether the coil be seated to a greater or lesser distance into the thread, provided the exposed surface of the coil projects beyond the crest of the thread. The test is so accurate that a concentricity within .001″ and as accurate as .0005″ or less Full Indicator Reading is obtainable.

One embodiment for determining the concentricity of external threads and one embodiment for determining the concentricity of internal threads is shown in the accompany drawings, in which:

FIG. 1 is a top plan view of a device for checking external threads;

FIG. 2 is a side elevation of the same;

FIG. 3 is a back view on the line 3—3 of FIG. 2;

FIG. 4 is a front view on the line 4—4 of FIG. 2;

FIG. 5 is a typical element showing external threads and several smooth, concentric external cylindrical surfaces and an internal cylindrical surface against which the concentricity of the thread is to be checked, and showing a coil spring partially threaded thereon;

FIG. 6 is an enlarged sectional view of a part of the same;

FIGS. 6A and 6B are similar sections showing coils made from wires that are not round;

FIG. 7 is a partial sectional view of the element clamped between a V-block and a clamping roller of the device, other parts of the device being omitted for clartiy;

FIG. 8 is a sectional end view on the line 8—8 of FIG. 7;

FIG. 9 is a front view of the device for checking internal thread concentricity;

FIG. 10 is a partial side view of the same;

FIG. 11 is a vertical sectional view on the line 11—11 of FIG. 10 showing the element being supported and checked; and FIG. 12 is an enlarged sectional view on the line 12—12 of FIG. 11 showing additional details.

The device for checking an external thread is shown in FIGS. 1 through 8. It includes a base 1 on the rear of which slide 2 is dove-tailed and clamped by the setscrew 3. The slide supports the gauge 5 by the arm 6 which is swingable about the upright 7 which may be fastened by tightening the clamping screw 8.

Supported on the front of the base is the V-block 10 which is notched at 11 (FIGS. 4 and 8) to support the element 15 which comprises the smooth, cylindrical surfaces 16, 17 and 18 and the external thread 19 when the spring coil 21 is snugly threaded thereon. FIG. 5 shows the coil being threaded on to the thread, and in FIG. 7 the threading operation has been completed and the threaded portion of the element is supported in the V-block 10.

The spring-loaded tension arm 25 which carries the clamping roller 26 is pivoted at 27 in the upright 28 which is part of the base.

Referring now to the other upright 29, also a part of the base, it is seen that the spring 31 is tensioned between (1) the head 32 of the rod 33 which is fastened in the arm 25 and (2) the slotted bracket 35 through which the rod 33 passes. The spring which is compressed between bracket 35 and the head 32 pulls the arm 25 down, applying pressure to the coil surface by the roller 26. This roller preferably is wide enough to contact several turns of the coil, but it is satisfactory if it contacts only a single turn. The pivot 27 can be positioned in any of the openings in the one arm 28, and the bracket 35 can be positioned in any of the holes in the arm 29 so as to accommodate larger or smaller elements 15.

To test the concentricity of the thread 19 against any of the surfaces 16, 17 or 18, the gauge 5 is positioned against that surface and the element is gradually rotated in the V-block. As it is rotated, the movement of the plunger 38 on the gauge is indicated by the gauge, and variations in the concentricity of this surface and the thread are measured, usually in thousandths of an inch. The device is so accurate that tolerances within several ten thousandths of an inch are measurable.

For measuring the concentricity of the external thread with the internal cylindrical surface 39 (FIG. 7), the device shown in FIGS. 1 to 4 would be used, but instead of a gauge with plunger 38 being used, a gauge with an arm adapted to fit into the opening 22 will be used.

The foregoing illustrations utilize a coil which is round in cross section. FIG. 6A shows the use of a coil 21A which is made of wire that is not entirely round, but is uniformly flat on its outer surface.

Assuming that the V of the thread of FIG. 6 is a 60° angle, a coil of wire 21B with sides at an angle of 60°, but truncated at the bottom may be used, provided the exposed surface is uniform. It is preferably ground flat. It is immaterial whether the corners are cut away as shown.

FIGS. 9 to 12 illustrate one type of apparatus which may be used for measuring the concentricity of internal threads on an element which includes one or more smooth, cylindrical surfaces concentric therewith.

The base 40 includes the two uprights 41 and 42 in which the spring-loaded tension arm 43 is mounted in the same manner as described in connection with the previous device, except that the spring 45, mounted on the bracket 46, pushes the arm 43 up instead of pulling it down as in the device of FIGS. 1 to 8.

The device 50 to be tested is shown in dotted lines in FIG. 10. It comprises the smooth, internal, cylindrical surface 52 and the internal threaded surface 53. The plunger 54 of the gauge 55 contacts the surface 52. The spring coil 56 is of slightly larger diameter than the threaded opening in the element 50 and it is threaded into this element, and the exposed internal surface of the coil forms the surface which is tested. The three rollers 60, 61 and 62 contact the exposed surface of the coil 56. The rollers 61 and 62 are rigidly mounted, extra holes in the base being provided so that they may be positioned at different locations. The roller 60 is mounted on the arm 43 and is pressed upwardly against the exposed surface of the coil and this draws this coil into contact with the rollers 61 and 62. The location of the three rollers automatically centers the element 50 on the base 40. These rollers 60, 61 and 62 are preferably mounted on threaded shanks 64 (FIG. 10) so that the rollers may be spaced different distances from the front face of the device, depending upon the location of the threaded surface which is to be tested. Any variations in the concentricity of the threaded surface 53 and the smooth surface 52 are registered by the gauge 55 as the element is gradually rotated, usually by hand.

Although the invention has been described in connection with testing the concentricity of a thread against a cylindrical surface, it is obvious that it includes the testing of the concentricity of two threads, both of which are external threads or both of which are internal threads or one of which is an external thread, the other being an internal thread.

Although in FIGS. 1 to 8 the device is shown as adapted for testing the concentricity of an external thread with an external cylindrical surface, and in FIGS. 9 to 12 the device is shown as adapted for testing the concentricity of an internal thread with a smooth internal cylindrical surface, it will be apparent that the concentricity of an external thread can be readily tested against an internal cylindrical surface and the concentricity of an internal thread can be tested against an external cylindrical surface.

The invention is covered in the claims which follow.

I claim:

1. In a device for testing the concentricity of a first thread against a smooth cylindrical surface or a second thread into which a first coil spring has been sprung, which spring is composed of metal of uniform diameter and substantially the same number of turns per inch as the second thread, with the exposed surface of said first coil spring extending beyond the crest of said second thread, both parts to be tested being parts of a rotatable element, the improvement in which a second coil spring of metal of uniform diameter and substantially the same number of turns per inch as the first thread is sprung into one or more turns of said first thread and the exposed surface of the metal of said second coil spring extends beyond the crest of said one or more turns of said first thread, and an indicator is mounted on said device and has means in pressure contact with the exposed surface of said second coil spring and with (1) said smooth cylindrical surface or (2) said first coil spring wherein said indicator measures the concentricity of the first thread with respect to the smooth cylindrical surface or the exposed surface of said first coil spring as the element is rotated.

2. The method of testing the concentricity of a first thread against a smooth cylindrical surface or a second thread, both said first thread and said cylindrical surface or said second thread being parts of an element, which method comprises springing into the first thread a coil spring of metal of uniform diameter and substantially the same number of turns per inch as the first thread, or springing separate coil springs in the first and second threads if the concentricity of two threads is to be tested, the metal of the coil spring or springs being exposed beyond the thread crest or respective thread crests, and while rotating the element, with an indicator measuring the concentricity of the first thread with respect to said smooth cylindrical surface or the exposed surface of the coil spring sprung into said second thread.

References Cited

UNITED STATES PATENTS

| | | | |
|---|---|---|---|
| 2,941,304 | 6/1960 | Man | 33—199 |
| 2,663,948 | 12/1953 | Scully | 33—199 |
| 2,443,820 | 6/1948 | Gabbey | 33—199 |
| 1,271,187 | 7/1918 | Lutz | 33—199UX |

OTHER REFERENCES

Karabrosk: I.B.M. Technical Disclosure Bulletin, Cathode Ray Tube Test Fixture, vol. 2, No. 5, February 1960, p. 13.

LEONARD FORMAN, Primary Examiner

S. L. STEPHAN, Assistant Examiner

U.S. Cl. X.R.

33—199